United States Patent [19]

Boynton

[11] 4,282,076

[45] Aug. 4, 1981

[54] METHOD OF VISBREAKING POLYPROPYLENE

[75] Inventor: Donald E. Boynton, Kennett Sq., Pa.

[73] Assignee: Hercules Incorporated, Wilmington, Del.

[21] Appl. No.: 76,054

[22] Filed: Sep. 17, 1979

[51] Int. Cl.³ .................................................. C08J 3/28
[52] U.S. Cl. ............................ 204/159.2; 260/28.5 A; 260/45.8 R; 260/DIG. 43; 264/22; 264/171; 264/176 F; 264/211; 264/349; 525/240
[58] Field of Search .................... 264/22, 171, 176 R, 264/176 F, 349, 211; 525/240; 260/DIG. 43, 28.5 A, 45.8 R; 526/914; 204/159.2

[56] References Cited

U.S. PATENT DOCUMENTS

| | | | |
|---|---|---|---|
| 3,121,070 | 2/1964 | Coover et al. | 525/240 |
| 3,144,436 | 8/1964 | Greene et al. | 526/914 |
| 3,287,342 | 11/1966 | Walton | 526/914 |
| 3,349,018 | 10/1967 | Potts | 204/159.2 |
| 3,598,885 | 8/1971 | Peters | 525/240 |
| 3,692,877 | 9/1972 | Shibahara et al. | 525/240 |
| 3,842,153 | 10/1974 | Owen et al. | 264/211 |
| 3,887,534 | 6/1975 | Baba et al. | 526/914 |
| 4,051,306 | 9/1977 | Tobias et al. | 525/1 |

*Primary Examiner*—Jeffery R. Thurlow
*Attorney, Agent, or Firm*—Joshua W. Martin, III

[57] ABSTRACT

A process for preparing an environmentally stable plastic composition having narrow molecular weight distribution by visbreaking a propylene polymer using an activated portion of the propylene polymer as a prodegradant. The process includes forming the prodegradant by activating a portion of the propylene polymer either by exposure to ionizing radiation or by oxidation.

13 Claims, No Drawings

METHOD OF VISBREAKING POLYPROPYLENE

BACKGROUND OF THE INVENTION

This invention relates to a process for lowering the molecular weight and narrowing the molecular weight distribution of crystalline propylene polymers. It relates particularly to a process for preparing an environmentally stable plastic composition by visbreaking propylene polymers to reduce the molecular weight controllably using an activated portion of the polymer as a prodegradant.

DESCRIPTION OF THE PRIOR ART

In the production of propylene polymers, i.e., polypropylene and crystalline copolymers, the molecular weight of the polymerized product may be rather closely controlled at any desired level above about 200,000 weight average molecular weight ($M_w$) corresponding to a melt flow rate (MFR) (gm./10 min. at 230° C.) of up to about 20. Yields of crystalline propylene polymers with a melt flow above about 20 made directly in polymerization are impractically low. To produce lower molecular weight products, the propylene polymer may be subjected to chain scission, a process which is called visbraking. This process not only lowers the molecular weight and raises the melt flow rate, but it also leads to a narrowing of the molecular weight distribution. One measure of the molecular weight distribution is the ratio of the weight average molecular weight to the number average molecular weight ($M_w/M_n$). A visbroken polymer of a given molecular weight has a better balance of processing and physical properties for many articles made from it than does a nonvisbroken polymer having the same molecular weight. Generally speaking, higher molecular weight leads to better physical properties but poorer processing properties; conversely, lower molecular weight leads to poorer physical properties but better processing properties. A low molecular weight polymer with narrow molecular weight distribution gives both good physical and processing properties in many fabricated articles. Therefore, it has been common procedure in the prior art to polymerize propylene polymers to a higher molecular weight than desired for the final application and then to visbreak to the desired molecular weight.

Several different types of chemical reactions which are well known can be employed for visbreaking propylene polymers. An example is thermal pyrolysis, which is accomplished by exposing a polymer to high temperatures, e.g., in an extruder at 350° C. or higher. Another approach is exposure to powerful oxidizing agents. A further approach is exposure to ionizing radiation. Another method, which is the method used almost exclusively in commercial practice, is the addition of a prodegradant to the polymer before pelletization.

A prodegradant is a substance which promotes chain scission when mixed with the polymer which is then heated under extrusion conditions. The prodegradants used in current commercial practice are mainly alkyl hydroperoxides or dialkyl peroxides. These materials, at elevated temperatures, initiate a free radical chain reaction resulting in scission of the polypropylene molecules. The use of alkyl hydroperoxide or dialkyl peroxide prodegradants has been a satisfactory method of visbreaking propylene polymers in many respects, but there is considerable room for improvement. One objectionable feature is the cost of the prodegradant. Another is the fact that the decomposition products of the prodegradants remain in the polymer as contaminants which may be noxious in some subsequent applications.

It is well known from laboratory experiments that propylene polymers may be reduced in molecular weight by exposure to air at elevated temperatures. This reduction is caused by oxidative chain scission. For economic reasons and because it is difficult to obtain a uniform controlled level of molecular weight reduction, this reaction is not the basis for a practical commercial visbreaking operation. However, air adventitiously entrained into an extruder in pelletizing operations may cause a small but measurable amount of visbreaking. The amount of visbreaking obtained in this manner is too small to cause an appreciable improvement in properties.

If propylene polymers are heated in the absence of air or any other reagents, a certain amount of molecular weight reduction takes place through thermal pyrolysis. The temperatures required are substantially higher than normally encountered in polymer processing. Because of the energy requirements and the poor heat transfer characteristics of high polymers, this reaction is economically unattractive as a basis for commercial visbreaking operations.

It is well known that gamma or beta radiation of sufficient intensity ruptures chemical bonds. When propylene polymers are subjected to such radiation, carbon-carbon bonds are ruptured resulting in chain scission with the creation of free radicals. Hydrogen-carbon bonds may also be ruptured creating additional free radical sites. Although this method of scissioning polypropylene is well established in the chemical literature, it is not employed on a commercial scale because of cost, hazard, and the difficulty of obtaining uniform irradiation.

It is an object of the present invention to devise a prodegradant by modification of a propylene polymer itself using no additional ingredients and producing no reaction products or by-products other than the scission products of the polymer itself. Preparation of the visbroken polymer in this manner involves processing of only a small portion of the propylene polymer in equipment other than a conventional extruder.

SUMMARY OF THE INVENTION

In accordance with this invention, a process is provided for preparing an environmentally stable plastic composition by visbreaking a propylene polymer to reduce its molecular weight controllably and narrow its molecular weight distribution, using an activated portion of the polymer as a prodegradant, which process includes: forming a prodegradant by activating a first portion of a propylene polymer, mixing the prodegradant with a second portion of propylene polymer which may contain a stabilizing amount of at least one antioxidant, wherein the second portion is at least equal in amount to the prodegradant portion, adding to the mixture of the prodegradant and second portion of the propylene polymer a stabilizing amount of at least one antioxidant if the second portion does not already contain a stabilizing amount of such a stabilizer, and heating the mixture to an extrusion temperature to controllably lower the molecular weight of the mixture, while substantially retaining the stabilizing effect of the antioxidant stabilizer or stabilizers.

DESCRIPTION OF THE PREFERRED EMBODIMENTS

In the practice of this invention, a portion of propylene polymer is activated, preferably by exposure to ionizing radiation or by air oxidation. Then the activated polymer is added to another portion of propylene polymer (50% to 99.5% of the total polymer mixture), together with a stabilizer or stabilizer combination and the mixture is heated to extrusion temperatures. As a result the entire mixture is significantly reduced in molecular weight and the molecular weight distribution is narrowed. If ionizing radiation is employed as the method of activation, irradiation is carried out, preferably by gamma rays or by a high voltage electron beam method, at a level of between 0.1 and 10 megarads, preferably 0.5 to 2.5 megarads. If air oxidation is the method of activation, that portion of the propylene polymer to be activated is oxidized to the extent that it contans between 0.005% and 0.125% of peroxy radical or hydroperoxide groups as determined by active oxygen analysis.

The term "propylene polymer" is employed herein to connote a solid, crystalline, essentially stereoregular or isotactic polymer derived predominantly from propylene, which may be polypropylene itself, a random copolymer of propylene with another olefin such as ethylene or 1-butene containing up to 10% of the other olefin or a block copolymer of propylene with another olefin such as ethylene or 1-butene containing up to 25% of the other olefin.

The following examples are provided to further illustrate the present invention. All parts and percentages are by weight unless otherwise indicated.

EXAMPLE 1

A control mixture of 100 parts polypropylene flake having a melt flow rate (MFR) of 3 and an intrinsic viscosity of 2.55 which corresponds to a molecular weight of about 360,000 ($M_w$) and with a molecular weight distribution of about 10 ($M_w/M_n$), plus 0.1 part of stabilizer antioxidant 1,3,5-trimethyl-2,4,6-tris(3,5-di-t-butyl-4-hydroxybenzyl) benzene and 0.1 part of calcium stearate was passed through a pelletizing extruder at a temperature of 288° C. with a holdup time of about three minutes. The melt flow rate of the resulting pellets was 13 which corresponds to a molecular weight of about 250,000 ($M_w$). To demonstrate the effect of the instant invention, a sample of the same polypropylene flake as used above in the control mixture was exposed to 1.5 megarads of electron beam (beta ray) radiation. One part of this irradiated flake was added to 100 parts of the control mixture and the resulting mixture was passed through a pelletizing extruder at 288° C. with a holdup time of about 3 minutes. The resulting pellets had a melt flow rating of 27, corresponding to a molecular weight of about 195,000. The pellets had a molecular weight distribution of about 4. Plastic cups made by injection molding these pellets, using both the process of this invention and the control process were equally tough and strong but the pellets made by the process of this invention permitted much faster molding cycles. A non-visbroken material polymerized directly to a melt flow of 27 which is the same melt flow rate as the sample made by the process of this invention, also gave fast molding cycles but the molded parts were much more brittle than those made from pellets produced by the inventive process. For example, when these injection molded cups were dropped on a concrete floor from a height of six feet, none of those made from the material processed according to this invention broke, while half of those made from the non-visbroken polymer of the same melt flow rate broke in this test. An injection molded sheet 0.05 inch thick made from the composition of this invention was tested for heat stability in an oven at 150° C. for 18 days. It retained its integrity, indicating that it would be stable to degradation under environmental conditions for a very long period of time. This stability is equivalent to that of the nonvisbroken polypropylene containing the same amount of stabilizer.

EXAMPLE 2

The control mixture of Example 1, to which 0.5% antioxidant light stabilizer 2-hydroxy-4-n-octyloxybenzophenone was added, was passed through a pelletizing extruder at 275° C. The resulting melt flow rate of these pellets was 5.5. In a fiber spinning experiment, where these pellets were melted in an extruder and pumped through a 50 hole spinneret by a gear pump at a temperature of 250° C. at a rate of ½ g/min./hole, forming a 9 denier per filament (dpf) fibers at a take-up rate of 500 meters per minute the treadline break frequency was found to be greater than 100 per 10,000 lb. of fiber produced.

To demonstrate the effect of the instant invention, 10 parts of the polypropylene flake used in the control mixture were exposed to 0.5 megarads of beta radiation and were then blended with 90 parts of the control mixture. This blend was passed through a pelletizing extruder at 275° C. The MFR of the resulting pellets was 68. The same fiber spinning experiment was run using these pellets, spinning the same 9 dpf fibers at the same take-up rate of 500 m/min. In this case the threadline break frequency dropped to less than 5 per 10,000 lb. of fiber. In addition, the output rate could be increased fourfold without increasing the threadline break frequency to the level encountered with the fibers made from the control mixture. Both the fibers formed in the control experiment and those formed from the polymer prepared under the conditions of this invention were resistant to degradation after exposure to sunlight for six months in Florida.

EXAMPLE 3

A control mixture consisting of the same type of polymer and additives as employed in the control mixture of Example 1 was extruded and pelletized at 235° C., except that tetrakis [methylene(3,5-di-t-butyl-4-hydroxy hydrocinnamate)] methane was used as the antioxidant. The MFR of the resulting pellets was 3.6. These pellets were extruded at 275° C. through a center fed flat film die with a 20 mil gap, and quenched on a chill roll to prepare a film 5 mils thick, which was smooth, bright, colorless and free of gels. The film had a gloss value of 80, a haze value of 3% and gauge uniformity of about 9%. A portion of the polypropylene flake used in the above control run was exposed to 2.5 megarads of gamma-radiation using a cobalt 60 source. To the samples containing 100 parts of the control mixture described above were added 0.5, 1.0, 5.0 and 10.0 parts of the irradiated flake. These samples were pelletized at 235° C. The respective MFR's were 9, 11, 19 and 27, respectively. These pellets were then extruded at 275° C. through a center fed flat film die with a 20 mil gap, and quenched on a chill roll, to prepare a film 5 mils thick, which was smooth, bright, colorless and free from gels. These films had gloss values of 85, haze values of 2% and gauge uniformity of about 5%. The films produced using the process of this invention were clearly superior to the control films in gloss, haze and gauge uniformity. Polypropylene with a normal molecular weight distribution as obtained directly from polymerization even with a MFR as high as 27 would not give films under these conditions with gauge uniformity as low as 5%. The films produced using the process of this invention were essentially equivalent to the control in resistance to heat and light exposure.

EXAMPLE 4

A sample of polypropylene flake with the same characteristics as that used in the control sample of Example 1 was exposed to air in an oven for two hours at 140° C. on a metal tray in a layer ½ inch thick. Analysis of the blended sample for active oxygen by the iodine liberation method [R. D. Mair and Alda J. Graupner, Anal. Chem. 36, 194 (1964)] showed 0.048% present, which would correspond to 0.096% hydroperoxide. Five parts and ten parts respectively of the treated flake were blended into batches containing 100 parts of the control mixture of Example 1. These batches were then passed through a pelletizing extruder at a temperature of 235° C. The melt flow rates of the resulting pellets were 34.1 and 54.0 respectively. Monofilaments of 100 denier size were prepared from each of these samples with no problem of spin breaks. The monofilaments when woven into a simple fabric were resistant to outdoor exposure in Florida for over three months.

EXAMPLE 5

A control mixture of 100 parts polypropylene flake having a melt flow rate of 0.5 and an intrinsic viscosity of 3.63 which corresponds to a molecular weight of about 580,000 ($M_w$) and with a molecular weight distribution of about 10 ($M_w/M_n$) plus 0.1 part of antioxidant stabilizer 1,3,5-trimethyl-2,4,6-tris(3,5-di-t-butyl-4-hydroxybenzyl) benzene and 0.1 part of calcium stearate was passed through a pelletizing extruder at a temperature of 210° C. with a holdup time of about three minutes. The melt flow rate of the resulting pellets was 0.8 which corresponds to a molecular weight of about 510,000 ($M_w$). To demonstrate the effect of the instant invention, a sample of the same polypropylene flake as used above in the control mixture was exposed to 0.1 megarad of electron beam (beta ray) radiation. Twenty-five parts of this irradiated flake was added to 75 parts of the control mixture and the resulting mixture was passed through a pelletizing extruder at 210° C. with a holdup time of about 3 minutes. The resulting pellets had a melt flow rating of 1.4, corresponding to a molecular weight of about 430,000. It had a molecular weight distribution of about 6. Using pellets from both the process of this invention and the control process, sheets 100 mils thick were formed by extruding at 240° C. in a 4½ inch extruder with a length to diameter ratio of 30:1, at a rate of 950 lb./hr. through a center fed flat sheeting die with a 105 mil gap. The sheets so formed were equally tough and strong but the sheet from the pellets made by the process of this invention had a smooth surface whereas the sheet from the control pellets had a rough orange peel-like surface. The visbroken sample was also extruded at 1000 lb./hr. rate while maintaining the same high quality of plastic sheet produced. Both the sheets formed from the visbroken sample and that prepared from the control were resistant to environmental degradation on exposure outdoors.

EXAMPLE 6

A one inch thick layer of polyproplene flake, as used in the control mixture of Example 1, was placed on a moving belt and exposed to electron beam radiation in a 550,000 volt machine. Penetration of the electron beam was to a depth of 0.125 inch into the flake, and the speed of the belt was adjusted so that this thickness of the flake was exposed to 1 megarad of radiation. The irradiated and unirradiated portions of the material were mixed and 0.1 part of antioxidant heat stabilizer 1,3,5-trimethyl-2,4,6-tris(3,5-di-t-butyl-4-hydroxybenzyl) benzene was added during the mixing process. In addition, 0.1 part of calcium stearate was also added. The mixture was extruded through a pelletizing extruder at 210° C. with a holdup time of about three minutes. The resulting pellets had a MFR of 28 and the molecular weight distribution was about 4. Sheets prepared from this polymer were resistant to degradation on outdoor exposure.

EXAMPLE 7

Polypropylene flake corresponding to that used in the control mixture of Example 3 was exposed to 0.5 megarad of beta radiation. Ten parts of this irradiated sample were mixed with 90 parts of a copolymer of propylene and ethylene containing 8% ethylene with a MFR of 2.5 compounded with the stabilizing additives used in Example 2. The mixture was extruded at 250° C. with a holdup time of about one minute. The resulting pelleted product had a MFR of 35 and a molecular weight distribution of about 4. Injection-molded articles prepared from these pellets were impact resistant and resistant to environmental degradation.

Examples of antioxidants and stabilizers useful in this invention include 2,6-bis(1-methylheptadecyl)-p-cresol, butylated styrenated cresols, 4,4'-butylidene bis(6-t-butyl-m-cresol), cyclic neopentanetetrayl bis(octadecyl phosphate), 4,4'-cyclohexylidene bis(2-cyclhexyl phenol), 3,5-di-t-butyl-4-hydroxyhydrocinnamic acid triester of 1,3,5-tris(2-hydroxyethyl)-s-2,6,6(1H,3H,5H) trione, 2,6-di-t-butyl-4-ethyl phenol, 2,2'-methylene bis(4-methyl-6-t-butyl phenol) octadecyl-3,5-di-t-butyl-4-hydroxyhydrocinnamate, tetrakis[methylene(3,5-di-t-butyl-4-hydroxyhydrocinnamate)] methane, 4,4-thiobis(6-t-butyl-m-cresol), 1,3,5-trimethyl-2,4,6-tris(3,5-di-t-butyl-4-hydroxybenzyl) benzene, tri(mixed mono- and di-nonylphenyl) phosphite, 1,3,5-tris(3,5-di-t-butyl-4-hydroxybenzyl)-2-triazine-2,4,6(1H,3H,5H) trione, tris(2-methyl-4-hydroxy-5-t-butylphenyl) butane, 1,3,5-tris(4-t-butyl-3-hydroxy-2,6-dimethylbenzyl)-1,3,5-triazine-2,4,6-(1H,3H,5H)-trione, and di-t-butyl-p-cresol. Such materials are normally employed at levels of about 0.1% to 1% based on the polypropylene. Secondary heat stabilizers, such as dilaurylthiodipropionate and light absorbing antioxidants, such as 2-hydroxy-4-n-octyloxybenzophenone may also be employed.

Pigments, mineral fillers, antiacids, slip agents, antistatic agents, resin modifiers and other polymers may also be mixed with the polypropylene without detracting from the operability of the invention.

In the practice of the invention, a portion of the polypropylene, e.g., 0.5% to 50%, preferably 5% to 25%, of the total amount to be visbroken, is activated by exposure to either ionizing radiation or to air oxidation. When this portion is mixed with the balance and the resulting mixture is heated to extrusion temperature of 200°–300° C., the entire mixture is significantly reduced in molecular weight, and the molecular weight distribution is narrowed. The reduction of the average molecular weight of the resulting mixture is greater than can be explained by dilution of the unexposed fraction of the polypropylene with the activated fraction of the polymer. Such a mixture without a subsequent chemical reaction being involved would be expected to have a broader molecular weight distribution than that of the original polymer and would lead to gel specks in film produced from the polymer blend and to spin breaks in fiber spinning using the blend, due to a tendency toward incompatibility between the original and the lower molecular weight activated portions of the polymer. Since the molecular weight distribution of the mixture after extrusion is narrowed and the resulting polymer gives gel-free films and improved fiber spinning performance, it is apparent that the whole polymer mixture has been modified during the extrusion process.

The examples above show that the activated fraction of the polypropylene causes chain scission in the unactivated fraction leading to a uniform lower molecular weight mixture. It is contemplated that the mechanism for this action is that the activated portion contains moieties which initiate free radical chain scission throughout the entire polymer melt. In the case of the samples activated using ionizing radiation, these moieties are considered to be free radicals, which may be converted to hydroperoxide groups on exposure to air over a period of time. The air oxidized samples have been shown by analysis to contain active oxygen groups, presumably hydroperoxides, whose decomposition during the extrusion operation initiates the visbreaking action.

What I claim and desire to protect by Letters Patent is:

1. A process for preparing an environmentally stable plastic composition by visbreaking a propylene polymer to controllably reduce its molecular weight, using an activated portion of said propylene polymer as a prodegradant, which process comprises:
   forming a prodegradant by activating a first portion of propylene polymer by exposure to ionizing radiation;
   incorporating said prodegradant into a second portion of propylene polymer, wherein said second portion is at least as large as said first portion;
   adding to the mixture of said first and second portions of said propylene polymer a stabilizing amount of an antioxidant; and
   visbreaking said mixture by shear mixing in an extruder while heating said mixture to an extrusion temperature between about 200° C. and 300° C. to controllably lower the molecular weight of said mixture and narrow the molecular weight distribution, while substantially retaining the stabilizing effect of said antioxidant stabilizer.

2. A process for preparing an environmentally stable plastic composition by visbreaking a propylene polymer to controllably reduce its molecular weight, using an activated portion of said propylene polymer as a prodegradant, which process comprises:
   forming a prodegradant by activating a first portion of propylene polymer by exposure to ionizing radiation;
   incorporating said prodegradant into a second portion of propylene polymer, wherein said second portion is at least as large as said first portion and said second portion contains a stabilizing amount of at least one reactive antioxidant stabilizer;
   visbreaking said mixture by shear mixing in an extruder while heating said mixture to an extrusion temperature between about 200° C. and 300° C. to controllably lower the molecular weight of said mixture, while substantially retaining the stabilizing effect of said antioxidant stabilizer.

3. The process of claims 1 or 2 wherein said ionizing radiation includes electron beam radiation.

4. The process of claims 1 or 2 wherein said ionizing radiation includes gamma-ray radiation.

5. The process of claims 1 or 2 wherein said ionizing radiation is between about 0.1 and 10.0 megarads.

6. The process of claims 1 or 2 wherein said ionizing radiation is between about 0.5 and 2.5 megarads.

7. The process of claims 1 or 2 wherein said reactive antioxidant stabilizer is a substituted phenol.

8. The process of claims 1 or 2 wherein said mixture is heated during extrusion with a holdup time of at least 30 seconds.

9. The process of claims 1 or 2 wherein said extrusion temperature is between about 225° C. and 275° C.

10. The process of claims 1 or 2 wherein said first portion constitutes from about 0.5% to 50% of the total weight of said first and second portions.

11. The process of claim 10 wherein said first portion constitutes from about 5% to 25% of the total weight of said first and second portions.

12. The process of claim 7 wherein said antioxidant stabilizer is 1,3,5-trimethyl-2,4,6-tris(3,5-di-t-butyl-4-hydroxybenzyl) benzene.

13. The process of claim 2, wherein said prodegradant is formed by exposing said first portion of said propylene polymer to ionizing radiation between about 0.5 and 2.5 megarads, said stabilizer is a substituted phenol, said first portion constitutes from about 5% to 25% of the total weight of said first and second portions and said mixture is heated during extrusion to a temperature between about 225° C. and 275° C. with a holdup time of at least 30 seconds.

* * * * *